March 6, 1928.

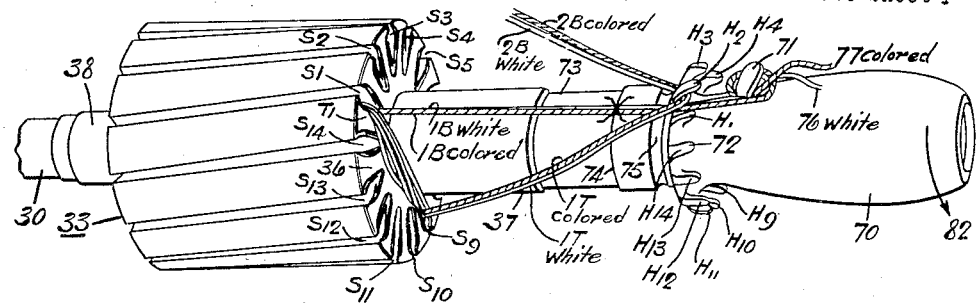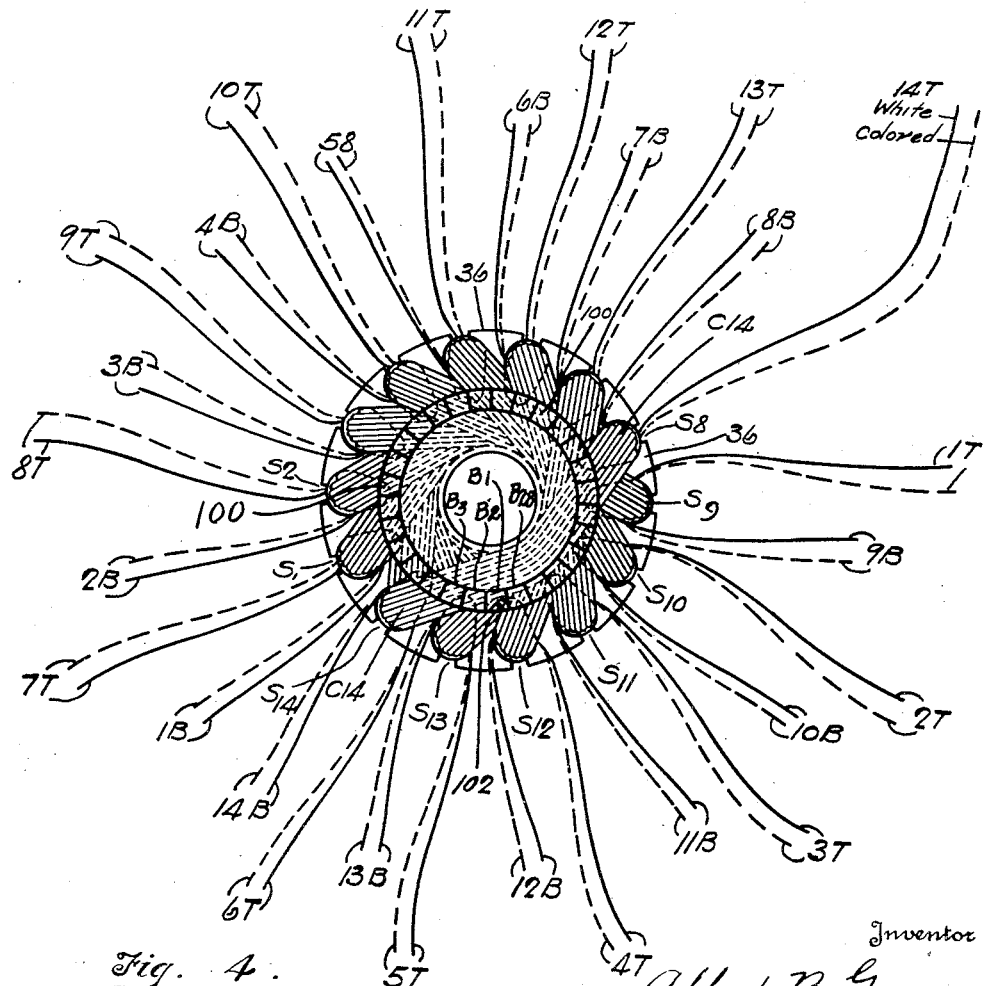

A. B. GOMORY 1,661,332

MANUFACTURE OF ARMATURES

Original Filed Feb. 3, 1923    3 Sheets-Sheet 2

Witnesses
Irvin A. Greenwald
Lee T. Hollen

Inventor
Albert B. Gomory
By Frederick J. Hardman
His Attorney

Patented Mar. 6, 1928.

1,661,332

UNITED STATES PATENT OFFICE.

ALBERT B. GOMORY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MANUFACTURE OF ARMATURES.

Continuation of application Serial No. 616,842, filed February 3, 1923. This application filed November 20, 1924. Serial No. 751,183.

This invention relates to the manufacture of armatures for dynamo-electric machines and particularly to armatures having open slotted cores.

This application is a continuation of my former application, Serial No. 616,842 filed February 3, 1923.

One object is to provide an improved process of winding the armature conductors upon the core in order to secure compactness of the windings and to facilitate the attachment of the terminals thereof to the commutator bars.

Other and further objects of the present invention will be apparent from the following description, reference being had to the accompanying drawings, wherein a preferred embodiment of the present invention is clearly shown.

In the drawings:

Fig. 1 is a perspective view of an armature showing the first armature coil wound thereon together with the handle assembled on the armature shaft, said handle being employed in the armature winding process;

Fig. 4 is an end view of a completely wound armature showing the ends of the armature coils.

Figure 2:
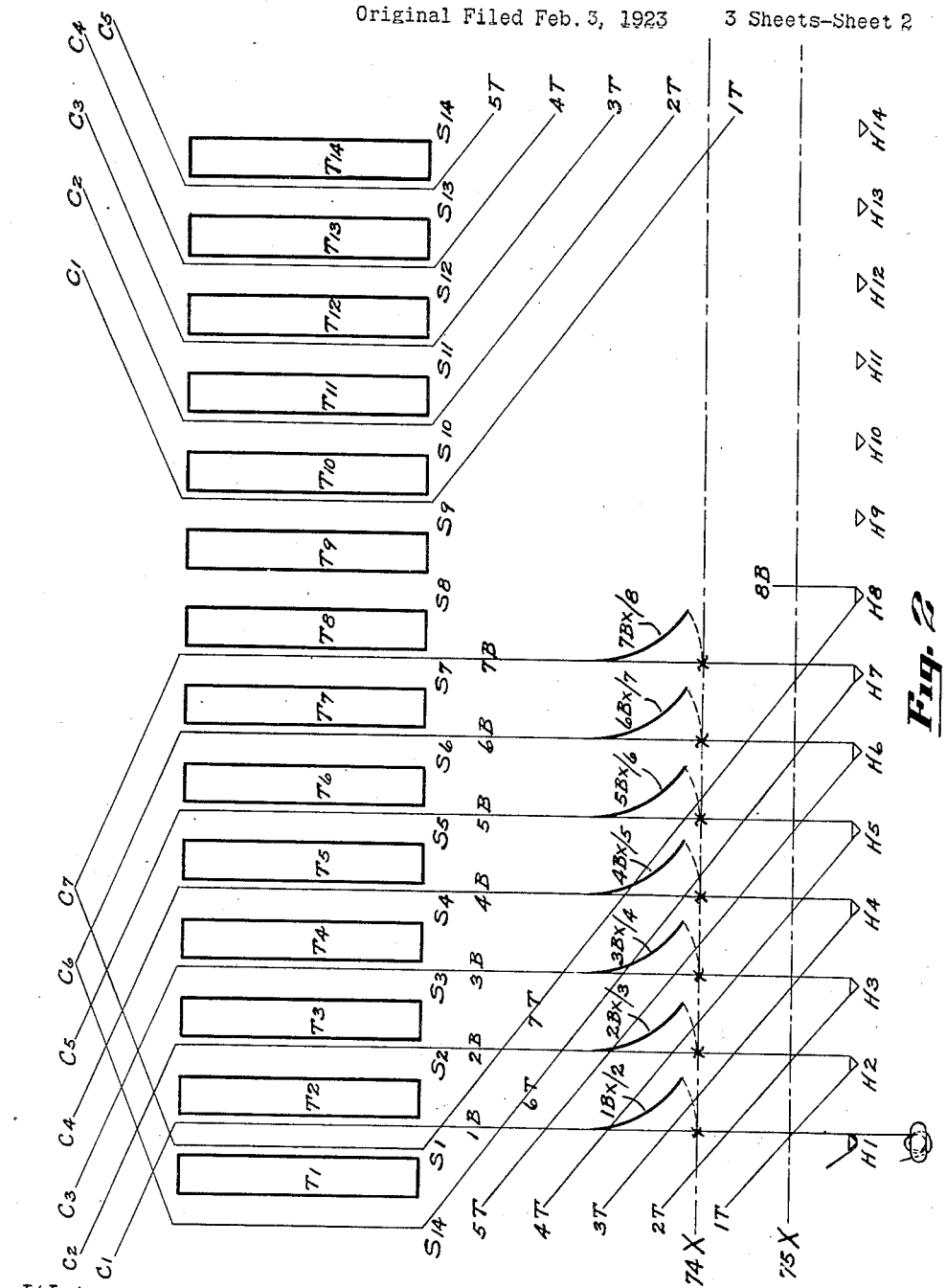
Figs. 2 and 3 are diagrams illustrating the winding process.

The armature shown in Fig. 1 includes a shaft 30 and a laminated core 33. This assembly of laminations provides a core having a plurality of teeth $T^1$, $T^2$, $T^3$, etc., which include slots $S^1$, $S^2$, $S^3$, etc.

The core laminations are held upon the shaft by a press fit over the knurled portion thereof, and each end of the core is provided with an insulating disc 36 of the same contour as the laminations. Adjacent the discs 36 the shaft 30 is provided with insulating tubes 37 and 38, formed preferably by wrapping on the shaft several turns of insulating paper, the free end of the paper strip being held down by paste. The core slots are insulated with strips of suitable nonconducting paper.

The wires for forming the armature coils are unwound from spools or reels of wire and each coil includes a plurality of turns, six turns in the example given. Two wires are wound upon the core simultaneously, and these wires are distinguished by providing one with white insulation and the other with colored insulation. It is the aim of the invention to wind the armature in such a manner that the terminals of the coils will not be packed down against the shaft insulating tube 37 as the coils are successively wound upon the core but will be packed by the overlapping portions of the coils against the core insulating disc 36. When the armature disclosed is completely wound there will be 14 coils of wire with white insulation and 14 coils of wire with colored insulation, making a total of 28 coils and 56 coil terminals which are to be connected with the 28 commutator bars after the winding process is complete. By referring to Fig. 4 it will be noted that all of these terminals are brought out along the core insulating disc 36 and that none of these terminal wires have been packed down against the armature shaft during the winding process.

The bottom terminals of the coils are designated $1^B$, $2^B$, etc., while the top terminals are designated $1^T$, $2^T$, etc. It will be noted that the bottom terminals are cut off shorter than the top terminals, and since the two coils which are wound simultaneously are distinguished by the color of the insulation, there will be no difficulty in identifying the terminals of the different coils. There will be no difficulty in locating the last coils wound on, namely coil 14 white and coil 14 colored, because, as shown in Fig. 4, these coils overlap all of the other coils and their top terminals are cut off longer than the other top terminals.

In order to produce these results, the wires joining the progressively wound armature coils are formed into loops, and these loops are severed in two places differing in distance from the armature core whereby to make the top terminals or leads from the armature coils longer than the bottom leads. Between successive winding operations some of these leads are bent away from the plane of the winding of the coils so that the overlapping portions of the coils cannot push the previously formed coil terminals down against the insulating tube 37. In other words, the winding must proceed in such a way that the coil terminals can be brought out alongside the insulation disc 36, and so as not to be pressed down by the successive coil winding operations against the tube 37.

In order to facilitate this process of winding, there is provided a handle or sleeve 70 which is provided with a central bore adapted to fit over one end of the armature shaft as shown in Fig. 1. The handle is provided with a peg 71 and with a plurality of hooks 72. The drawings show a handle having 14 hooks, one for each of the 14 slots of the armature core which has been selected as an example to illustrate the winding process. The handle includes a sleeve 73 having an internal diameter sufficient to receive that portion of the armature to the right of the armature insulation 37 shown in Fig. 1 but the internal diameter of the sleeve 73 is less than the external diameter of insulation 37 so that this insulation acts as a stop to limit the movement of the handle 70 toward the armature core. The sleeve is provided with a shoulder 74 which serves as a guide for the blades of a pair of wire snippers so that the bottom leads or ends extending from the first turns of the coils will all be severed off a uniform distance from the armature core. The sleeve 73 is provided with a groove 75 which serves as a guide for the snipper blades to facilitate cutting off the top leads or ends from the last turns of the coils at a uniform distance from the armature core and so that the top leads or terminals will be longer as measured from the core, than the bottom leads.

The present method of making an armature may be carried on by an armature winding machine of the type disclosed in my copending application, Serial No. 740,058, filed September 26, 1924, but, obviously, may be carried on without the aid of a winding machine, or even the handle or sleeve 70, although this sleeve facilitates the loop-forming operation between successive winding operations.

The ends of the wires 76, and 77, which are to be wound upon the armature core, are first twisted around the peg 71 of the handle 70, and the wires are wound into certain spaced slots marked $S^1$ and $S^9$ in Fig. 1. $S^1$ denotes the slot which receives the starting-active-coil side of the first coil to be wound, and the slot $S^9$ receives the ending-active-coil side of this coil.

Fig. 1 shows the first pair of coils to be wound on. The first or bottom turn of each coil extends through slot $S^1$ and across the back of the core (the face of the core remote from the commutator) and then toward the commutator end of the armature through the slot $S^9$. In the example given each coil includes 6 turns. The bottom terminals of the pair of coils are designated by $1^B$ white and $1^B$ colored in Fig. 1 and include that portion of the wire between the peg 71 and the slot $S^1$. The leads from the last turns of the first coil to be wound on are designated $1^T$ white and $1^T$ colored in Fig. 1, and these ends are hooked over the hook $H^2$ and these wires which proceed from the hook $H^2$ will form the bottom leads of the second coil wound on. Therefore these leads are designated $2^B$ white and $2^B$ colored. After the first coil has been wound on, the ends of wires 76 and 77 are unwound from the peg 71 and are wrapped around the hook $H^1$.

Between successive coil winding operations the armature shaft is rotated through an angle defined by the pitch of the core slots so as to bring the next pair of spaced core slots into cooperative relation to the wire guides of the machine.

If the winding of the second pair of coils were to proceed without clipping the coil terminals $1^B$ white and $1^B$ colored, it is apparent from Fig. 1 that a portion of the second coil wound on would overlap these leads or terminals because a portion of the coil would extend across the core insulating disc 36 between the slots $S^2$ and $S^{10}$. This portion would press the terminals $1^B$ white and $1^B$ colored down against the insulating tube 37. If none of the coil leads were clipped during successive coil winding operations, and the clipping of the leads were to be postponed until all of the coils were wound on, the result would be that the overlapping portions of these coils, which are clearly shown in Fig. 4, would press all of the bottom leads of the coils and the first seven pair of top leads down against the insulating tube 37 whereas the last seven pair of top leads would require the placing of the commutator at such a distance from the core as to permit bringing these bottom leads and top leads in the first seven coils around the end of the armature coils and the space would have to be sufficient for properly insulating these leads from the overlapping portions of the coils, and there would need to be some abrupt bends made in some of the leads before they are brought out to their respective commutator bars. Such a construction would take up more room than necessary and would require additional labor to apply the necessary insulating material. But if the coil leads are all brought out alongside the core insulating disc 36, that is packed in between this disc and the overlapping portions of the armature coils, then the insulation of these leads and their attachment to the commutator bars will be much simplified and the space required will be materially reduced. Therefore before any subsequent pair of coils are wound on, the bottom leads of the preceding pair of coils are severed by cutting these wires at X in Fig. 1 which is done by applying the wire snippers along the edge of the shoulder 74.

Figure 3:
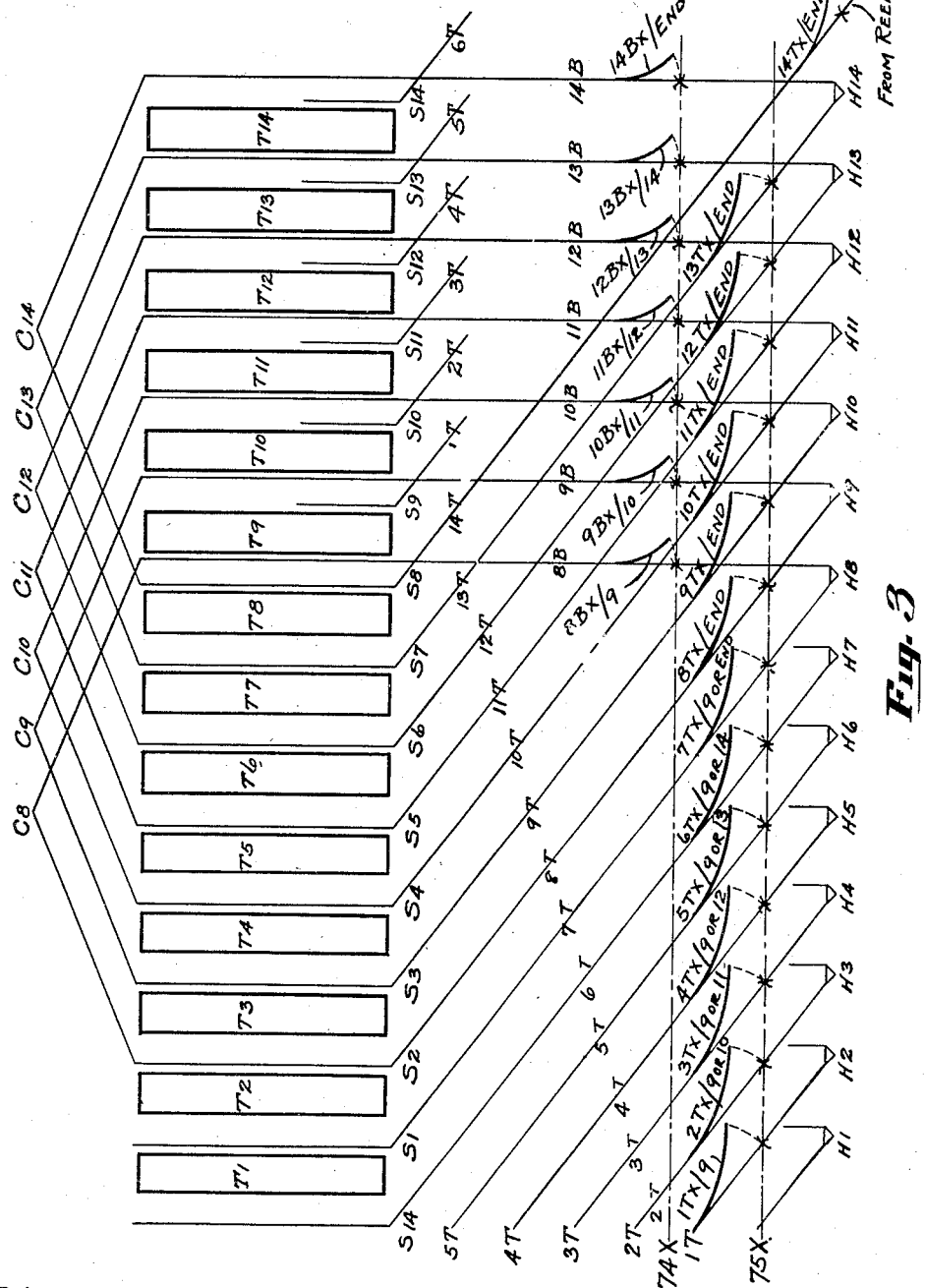

The winding process is illustrated diagrammatically in Figs. 2 and 3. In these diagrams, the white and colored wires are considered as one wire, since the process disclosed can be applied to the winding of one or more coils simultaneously. The core teeth are designated by $T^1$ to $T^{14}$, the slots are designated by $S^1$ to $S^{14}$, and the coils by $C^1$ to $C^{14}$. The bottom leads of the respective coils are designated by $1^B$ to $14^B$, respectively, and the top leads are designated by $1^T$ to $14^T$, respectively. The cutting lines $74^x$ in Figs. 2 and 3 represents the shoulder 74 shown in Fig. 1. The cutting line $75^x$ designates the groove 75 shown in Fig. 1. The different hooks 72 shown in Fig. 1 are designated by $H^1$ to $H^{14}$ in Figs. 2 and 3, one hook for each of the slots $S^1$ to $S^{14}$. It will be noted that where the lead $1^B$ crosses the cutting line $74^x$, a small $x$ is placed to designate that the lead $1^B$ is cut along the shoulder 74 of the handle 70, the heavy curved line which is designated by the symbol $1^{Bx}/2$ means that before winding coil $C^2$, the lead $1^B$ is cut off along the shoulder 74 and is bent away from the winding region. The heavy curve line designated by the symbol $2^{Bx}/3$ denotes that before coil $C^3$ is wound on, the bottom lead of coil $C^2$ known as $2^B$ is cut off along the shoulder 74 and moved away from the winding region so as to be overlapped by coil $C^3$ but be positioned between coil $C^3$ and the core insulating disc 36. With this explanation the meaning of the symbols $3^{Bx}/4$ in Fig. 2 to the symbol $13^{Bx}/14$ will be readily apparent. These symbols simply mean that before coils 2 to 14 are wound on, the bottom leads of coils $C^1$ to $C^{13}$ are severed, respectively. It is apparent that since coil $C^{14}$ is the last one on, its bottom lead $14^B$ will not be severed until after the winding operation is complete. The symbol $14^{Bx}/$ end is used to designate this step.

It is apparent in Fig. 1 that until the first eight coils are wound on, the top leads of the preceding seven coils need not be clipped. But since the coil $C^9$ enters the slot $S^9$ in which a portion of coil $C^1$ is contained, the top lead of coil $C^1$, lead $1^T$, must be severed and moved out of the winding region. Since it is desired to have the top leads longer than the bottom leads in order to distinguish them, the top leads with the exception of $14^T$ are severed adjacent the notch 75. Referring to Fig. 3, the points of intersection of the lines $75^x$ with the leads $1^T$ to $13^T$ are designated by $x$ to denote that the top leads are severed at the groove 75. The top leads $1^T$ to $7^T$ might all be severed at the groove 75 before coil $C^9$ is applied. However, if this is not done, $1^T$ must be severed and bent out along the disc 36 before coil $C^9$ is applied, $2^T$ must be severed and bent out before coil $C^{10}$ is applied etc., and lead $6^T$ must be bent out before coil 14 is applied. Therefore the symbol $1^{Tx}/9$ applied to the heavy curved line just below it, denotes that $1^T$ is cut at the groove 75 before coil $C^9$ is applied. The curve line designated by the symbol $2^{Tx}/9$ or 10 designates that the terminal $2^T$ must be cut off at groove 75 and bent to one side before coil $C^9$ is applied or at least before the winding of coil $C^{10}$. The terminals $7^T$ to $14^T$ need not be severed until the end of the winding operation. The lead $14^T$ is not severed at the groove 75 but this terminal is cut off longer than the others in order to make it clearly distinguishable, and instead of wrapping $14^T$ around hook 1 this lead is simply wrapped around the other leads to hold them in position after the armature is removed from the winding machine. In other words the leads are not all spread out as shown in Fig. 4 but are tucked down along the armature shaft after the handle 70 has been removed and the long lead $14^T$ is used to hold the other leads temporarily in position.

The next step in the manufacture of the armature is to mount upon the armature shaft a commutator which is substantially complete except for machining the commutator bars. Such a commutator is shown at 100 in Fig. 4, and has bars which are insulated by mica segments in the usual manner and the commutator is mounted upon the shaft so that every other mica strip is in substantial alignment with the end of a core slot. The next step is to provide one of the commutator bars with a distinguishing mark in order to facilitate the operation of connecting the armature core leads with the proper commutator bars. Looking at the commutator end of the armature as viewed in Fig. 4, the terminals $14^T$ are clearly distinguishable since they come out on top and emanate from a coil which overlaps all of the other coils and therefore must be coil $C^{14}$. The terminals $14^T$ are also distinguishable from the outside terminals because these are longer than any of the others. The overlapping portion of coil $C^{14}$ which is visible in Fig. 4, extends from slot $S^{14}$ to slot $S^8$. Beginning with slot $S^{14}$, which is of course the slot where coil $14^C$ first enters, the operator will count three slots moving in a counterclockwise direction and arrive at the slot $S^{12}$. The commutator bar which is immediately to the left of the center line of slot $S^{12}$ is marked by a prick punch as indicated at 102 to denote that this bar is bar No. 1 meaning the one to which the bottom lead of the coil No. 1 of white insulated wire (designated $1^B$ white) is connected. The wires $2^B$ white to $14^B$ white are connected with commutator bars #3, #5, #7, etc., to bar #27, respectively. These leads are wrapped with insulation and leads $1^B$ colored to $14^B$ colored are connected with commutator bars #2, #4, #6, etc., to bar #28, respectively. These leads are wrapped with insulation and leads 1ᵀ white to 14ᵀ white are connected with every other commutator bar beginning with bar #28. These leads are wrapped with insulation and leads 1ᵀ colored to 14ᵀ colored are connected with bars #1, #3, #5, etc., to bar #27, respectively.

The subsequent steps include soldering the leads to the commutator bars, and trimming the commutator.

It is apparent that the winding process described can be applied to an armature including a core having any number of slots, and the pitch of the armature coils may be different from that shown in the drawings. In any case the bottom lead of any coil must be severed and bent away from the winding region of the next coil to be wound before the next succeeding coil is wound on. By bending a lead away from the winding region of the next coil to be wound is meant to bend the lead relative to the active-coil-side from which it continues in such a direction that it will not be overlapped by the end portions of the next coil to be wound upon the core.

Letting S be the number of slots, and T, the number of core teeth embraced by a coil, when S—T coils have been wound on, all of the slots will contain a portion of at least one coil. Therefore before the next coil is wound on the top lead of the first coil must be severed and moved out of the winding region of the next coil to be wound. Generally stated, the present process includes the step of cutting the top lead of the Nth coil before the (N+S—T)th coil is wound on, N being the order number of the coil whose top lead is severed. For example, if there are fourteen slots and six teeth are embraced by the coil, then the top lead of the first coil must be cut before the (1+14—6)th or 9th coil is wound on, the top lead of the second coil must be cut before the (2+14—6)th or 10th coil is wound on etc. Obviously if only fourteen coils are wound on, then after the fourteenth coil has been wound, the clipping of the coils after the sixth will be done at the end of the winding operation.

While the process and form of mechanism herein shown and described constitutes a preferred embodiment of the invention, it is to be understood that other forms might be adopted, all coming within the scope of the claims which follow.

What is claimed is as follows:

1. The process of making an armature which includes winding successively upon an open slotted armature core a plurality of coils of wire, providing between successive coils a loop of wire one branch of which leads from the ending active-coil-side of the preceding coil and the other branch of which leads to the starting active-coil-side of the next succeeding coil; and in severing the loop branch leading to the starting active-coil-side of a preceding coil to provide separated coil leads for said preceding coil, and in bending the lead of starting active-coil-side of the preceding coil away from the winding region of the next coil to be wound before winding the next succeeding coil in order that the severed lead may be brought out between the end of the core and the wire conductors overlapping the end of the core.

2. The process of making an armature according to claim 1 and including in addition thereto the following step which is introduced before winding a coil into a slot already containing an active-coil-side of a previously wound coil, namely: the step of bending the ending lead continuing from said previously wound, active-coil-side away from the winding region of the next coil to be wound before winding said next coil, in order that said lead may be brought out between the end of the core and the wires overlapping the end of the core.

3. The process of making an armature which includes assembling a slotted core upon a shaft, placing upon the shaft a sleeve carrying a plurality of angularly spaced hooks located a substantial distance from the core, progressively winding coils of wire into slots of a certain spacing, providing between successive coil winding operations a loop of wire the branches of which provide the ending lead of a preceding coil and the starting lead of the next succeeding coil, said loop being formed by passing the wire extending from the ending active-coil-side of a preceding coil around one of said hooks before beginning to wind a succeeding coil, and, before winding the next coil, cutting the wire loop joining the two last preceding coils between the starting active-coil-side of the last preceding coil and the hook about which the last mentioned loop was formed in order to free the start lead of the last preceding coil, then, bending said start lead away from the winding region of the next coil to be wound before proceeding to wind it, the remaining portion of the severed loop remaining bent around said hook, the process including in addition to the foregoing, the following steps which are introduced before winding into a slot containing the ending active-coil-side of a previously wound coil, namely: the step of freeing from its hook the ending lead of a previously wound coil whose ending active-coil-side is in a slot next to receive a coil, and the step of bending said ending lead away from the winding region of the next coil to be wound.

4. An armature for dynamo-electric machines comprising in combination, a slotted core, a commutator, and a plurality of coils each embracing a plurality of core teeth and having leads for connecting the coils with certain bars of the commutator, the coils overlapping each other at the ends of the core, and the leads which continue from turns of the coils which are underneath other turns extending from the coils to the commutator from between the end of the core and the overlapping coil portions adjacent that end of the core.

5. An armature for dynamo-electric machines comprising, in combination, a slotted core, a commutator, and a plurality of coils each embracing a plurality of core teeth, and having leads for connecting the coils with certain bars of the commutator, the coils overlapping each other at the ends of the core, each core slot receiving portions of a plurality of coils, the start and end leads of coils underneath other coils and the start leads of coils overlying other coils in a core slot extending from the coils to the commutator from between the end of the core and the overlapping coil portions adjacent that end of the core.

In testimony whereof I hereto affix my signature.

ALBERT B. GOMORY.